United States Patent
Sharma et al.

(10) Patent No.: US 10,977,518 B1
(45) Date of Patent: Apr. 13, 2021

(54) MACHINE LEARNING BASED ADAPTIVE INSTRUCTIONS FOR ANNOTATION

(71) Applicant: Amazon Technologies, Inc., Seattle, WA (US)

(72) Inventors: Rahul Sharma, San Jose, CA (US); Vikram Madan, San Francisco, CA (US); James Robert Blair, Seattle, WA (US); Charles Bell, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 16/355,617

(22) Filed: Mar. 15, 2019

(51) Int. Cl.
*G06K 9/62* (2006.01)
*G06N 5/04* (2006.01)
*G06N 20/00* (2019.01)

(52) U.S. Cl.
CPC ........... *G06K 9/6256* (2013.01); *G06N 5/048* (2013.01); *G06N 20/00* (2019.01)

(58) Field of Classification Search
CPC .... G06K 9/6256; G06K 9/6254; G06K 9/626; G06K 9/6253; G06N 20/00; G06N 5/048; G06N 99/00; G06N 5/04; G06N 5/025; G06N 5/042; G06F 9/455; G06F 17/18; G06F 8/60; G06Q 10/06

See application file for complete search history.

(56) References Cited

U.S. PATENT DOCUMENTS

2019/0042953 A1\* 2/2019 Duesterwald ........ G06K 9/6254
2020/0167671 A1\* 5/2020 Okada .................... G06N 20/00

\* cited by examiner

*Primary Examiner* — Jianxun Yang
(74) *Attorney, Agent, or Firm* — Nicholson De Vos Webster & Elliott LLP

(57) ABSTRACT

Techniques for generating and utilizing machine learning based adaptive instructions for annotation are described. An annotation service can use models to identify edge case data elements predicted to elicit differing annotations from annotators, "bad" data elements predicted to be difficult to annotate, and/or "good" data elements predicted to elicit matching or otherwise high-quality annotations from annotators. These sets of data elements can be automatically incorporated into annotation job instructions provided to annotators, resulting in improved overall annotation results via having efficiently and effectively "trained" the annotators how to perform the annotation task.

20 Claims, 10 Drawing Sheets

▶ LABELING JOBS

SPECIFY JOB DETAILS

*NEW LABELING JOB INFORMATION*

NAME
| 2019_INSECT_BATCH |

INPUT DATASET LOCATION
| SERVICE://ABCDEF/INPUT/ |

OUTPUT DATASET LOCATION
| SERVICE://ABCDEF/OUTPUT/ |

*TASK TYPE*

◉ IMAGE CLASSIFICATION
○ OBJECT DETECTION

TASK DESCRIPTION
| LABEL WHETHER THERE IS AN INSECT IN THE IMAGE |

LABELS
| YES; NO |

*INSTRUCTIONS*
THESE BRIEF INSTRUCTIONS APPEAR IN A SIDE PANEL OF THE LABELING TOOL FOR EASY REFERENCE.

| SELECT "YES" IF ANY INSECT, OR UNAMBIGUOUS PORTION OF AN INSECT, APPEARS IN THE IMAGE; OTHERWISE, SELECT "NO" |

▶ GOOD EXAMPLES        *(SELECTED: AUTO-IDENTIFY)*

▶ BAD EXAMPLES         *(SELECTED: AUTO-IDENTIFY)*

▼ EDGE CASE EXAMPLES

◉ AUTOMATICALLY IDENTIFY EDGE CASE IMAGES
  ○ SPECIFY EDGE CASE IMAGES

*FIG. 2*

```
INSTRUCTIONS:
    DRAW A BOX AROUND ANY AUTOMOBILE SHOWN IN THE IMAGE
VIEW EXAMPLES:
        GOOD EXAMPLES – N/A
        POOR EXAMPLES – N/A
        EDGE CASES – N/A
```
⎫ 500
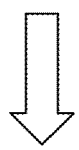
```
INSTRUCTIONS:
    DRAW A BOX AROUND ANY AUTOMOBILE SHOWN IN THE IMAGE
VIEW EXAMPLES:
    ▼ GOOD EXAMPLES
```
⎫ 550
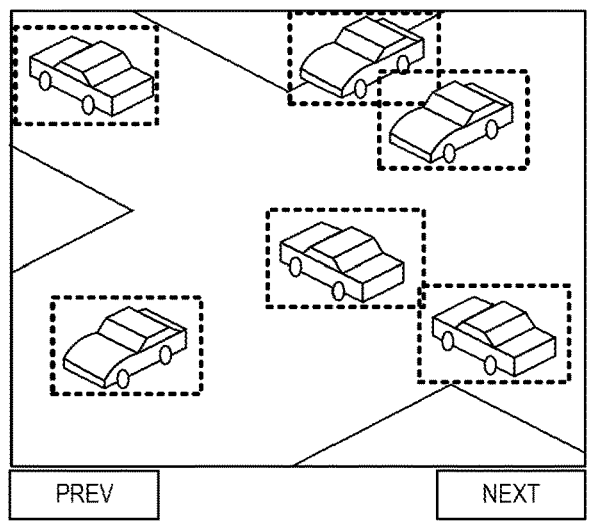
```
    [PREV]                          [NEXT]
    ▶ POOR EXAMPLES
    ▶ EDGE CASES
```
⎫ 555
FIG. 5

US 10,977,518 B1

MACHINE LEARNING BASED ADAPTIVE INSTRUCTIONS FOR ANNOTATION

BACKGROUND

To generate machine learning (ML) models via supervised learning, training data must be obtained that includes both data (e.g., an image, a block of text) as well as labels for the data (e.g., coordinates of a car within an image, starting and ending positions of a brand-name used in text). However, gathering labels for data from human annotators—a process referred to as manual annotation—is extremely tedious, error-prone, and time consuming One way to use human annotators is via crowdsourcing, in which a large number of human workers are provided instructions, examples, and annotation tools to label the data.

BRIEF DESCRIPTION OF DRAWINGS

Various embodiments in accordance with the present disclosure will be described with reference to the drawings, in which:

FIG. 2 is a diagram illustrating an exemplary user interface for configuring an annotation job according to some embodiments.

FIG. 5 is a diagram illustrating an exemplary user interface including an adaptive instruction for an annotation job presenting selected image data elements according to some embodiments.

DETAILED DESCRIPTION

Figure 1:
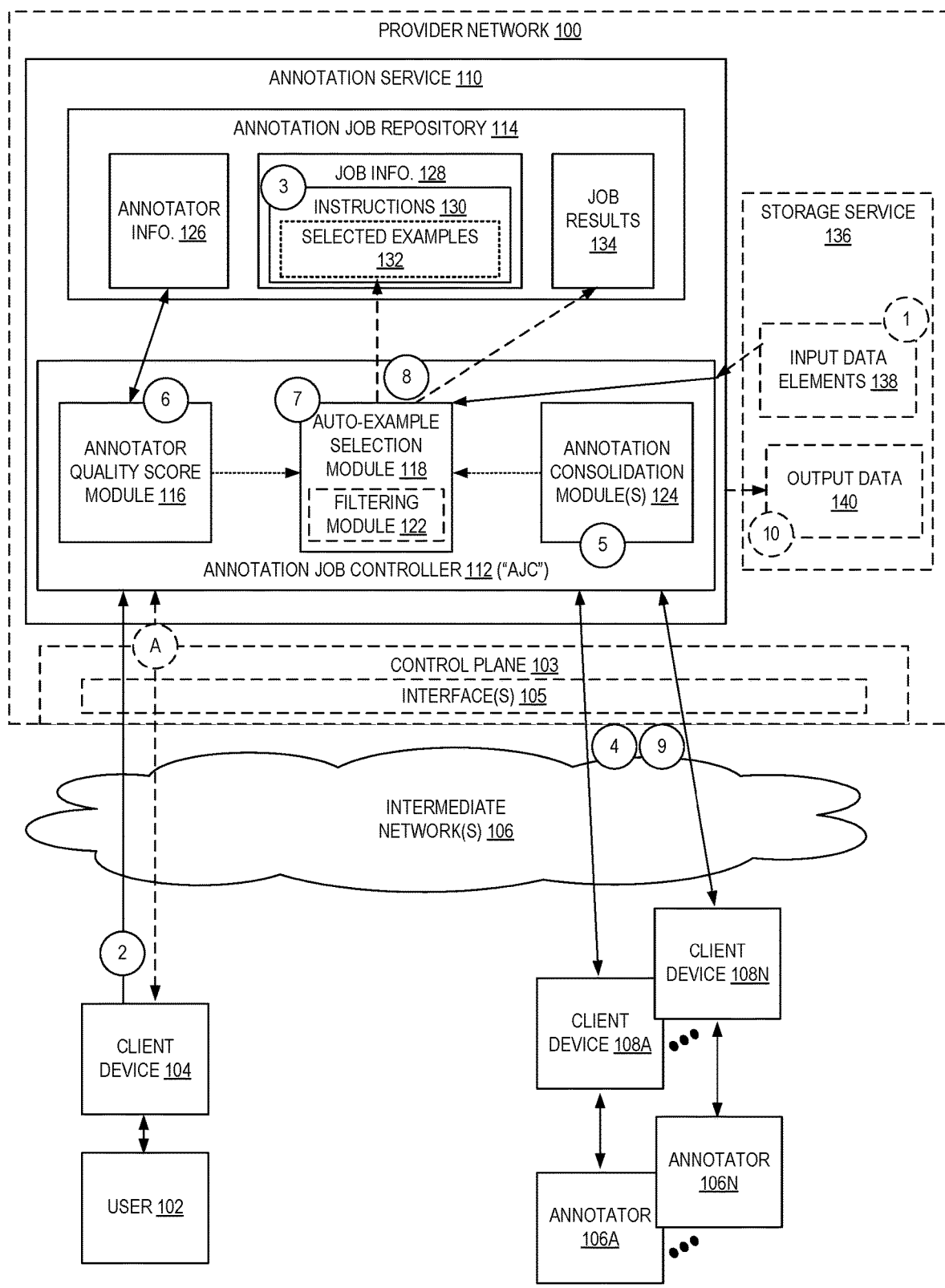
FIG. 1 is a diagram illustrating an environment for ML-based adaptive instructions for annotation according to some embodiments.

Various embodiments of methods, apparatus, systems, and non-transitory computer-readable storage media for generating and utilizing machine learning-based adaptive instructions for annotation are described. According to some embodiments, an annotation service can automatically identify a set of data elements that may beneficially be introduced into annotation job instructions to improve the annotation performance of annotators. The automatically identified data elements may include those that represent edge cases where it may be impossible (or extremely difficult) for an annotator to correctly provide an annotation given the set of instructions for the annotation job, data elements that may be "easy" or straightforward to annotate, and/or data elements that may be difficult to annotate. The annotation service may automatically update annotation job instructions on behalf of the job-submitting user to include the identified data elements, thus training annotators via useful examples (e.g., those that present a high or low amount of confusion for annotating) that are specific to the particular annotation job at hand. The annotation service may also solicit additional feedback from the annotators during the annotation of certain types of data elements to further improve the training of an annotating machine learning model and/or the ability to detect or process annotations for edge case data elements, bad/difficult data elements, etc. Accordingly, the annotation service can automatically and quickly identify useful examples of data elements to be provided as part of annotation job instructions, removing the need for job submitters to manually find such examples from often exceedingly large sets of data elements. Optionally, the annotation service may notify the job submitter of the existence of these automatically identified data elements and allow the submitter to further update the annotation job instructions to clarify what is to be done for such use cases, select ones of the selected data elements to be included or not included in the job instructions, etc.

Obtaining high-quality annotations (or "labels" often generated based on annotations, such as identifiers of classes of entities represented in a data element, bounding boxes of objects in a data element, and the like) for data elements (e.g., images, videos, audio clips, documents, etc.) to ultimately be used to train ML models is challenging. In practice, crowdsourced labels generated by a team of annotators are often "noisy" or inaccurate. One factor leading to this noise is due to low-quality instructions being generated by annotation job submitters that are provided to the annotators. For example, if an annotation task is not well-designed or clearly described by the requestor, the annotators—which may include many different people having different backgrounds and levels of experience and understanding—may not be able to uniformly provide the proper annotations sought by the requestor.

Thus, creating high-quality instructions for human annotators is critical, but often very difficult. For example, annotation job submitters may need to select representative examples of data elements with "high-quality annotations" and, for even better results, examples of "bad quality annotations" to help annotators—who often have little to no context on the problem being solved—deliver high-quality annotations. As is known, obtaining high-quality annotations is extremely important to ensure that a model can be trained accurately, without bias, and perform well in practice.

Today, many users typically write annotation job instructions on a "best efforts" basis, with no assistance other than their own knowledge. Users then typically publish a subset of their data elements to the annotators, inspect the results, identify any "surprises" where the annotators misunderstood a particular instruction, found an edge case, or spotted something under-specified in the instructions. The users must then iterate on the instructions to account for these found issues—typically multiple times—before the instructions are complete and clear enough to enable a set of annotators to deliver high-quality results for the entire set of data elements.

This problem is compounded for large workloads of training data elements, as this iteration cycle can take considerable time, effort, and expense. As one example, a user may provide instructions to a set of annotators to draw bounding boxes around humans shown in images. However, many edge cases may arise given these "simple" instructions that may lead to inconsistent results from the annotators, such as when an image shows only a portion of a human (e.g., a leg or arm, while the rest of the person is out of frame) or when multiple people are situated extremely close to one another (e.g., hugging) so that it is unclear whether the annotator should draw two bounding boxes or one, or how those boxes should be drawn (e.g., overlapping or not).

Accordingly, embodiments disclosed herein can utilize machine learning techniques (e.g., active learning) and data about the annotators to provide help to annotation job submitters by curating great "example images" to be provided in annotation job instructions, such as edge case type examples (of high annotation difficulty) that can be used to help train annotators to perform their task well. As a result, and in contrast to typical operation, embodiments can utilize ML itself to generate "training data" that can be used to train humans (as opposed to machines) to assist in gathering training data for machines. Embodiments can identify a variety of types of data elements, such as those that are "good" (e.g., where a large number of annotators are able to correctly annotate a data element), those that are "bad" (e.g., where a large number of annotators are unable to correctly annotate a data element), and/or those data elements that are "edge" cases that are the most controversial in which reasonable annotators may disagree and produce different annotations. Embodiments can find such classes of data elements using a variety of techniques, such as through use of a model that is updated in real-time to assess worker quality together with another model or models to predict and/or identify which data elements cause (or are likely to cause) the most or least disagreement between annotators and/or difficulty for annotators. Embodiments may also utilize consolidation algorithms (e.g., to merge separate annotator results together into a single result) that may run in real-time. In some embodiments, these identified data elements may be included in job instructions during an annotation job to "teach" the annotators how to deal with difficult types of data elements, thereby improving the accuracy of their work.

FIG. 1 is a diagram illustrating an environment for ML-based adaptive instructions for annotation according to some embodiments. The environment includes an annotation service 110 including an annotation job controller 112, or "AJC," that controls various annotation processes for annotation jobs and can identify useful types of data elements to be included in job instructions for annotators to improve the quality of their annotations. The AJC 112 may be implemented as one or more software modules executed by one or more computing devices of a provider network 100 and may be a component of another service such as an annotation service 110 that can run annotation jobs on behalf of users.

A provider network 100 provides users (e.g., user 102) with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service 136 that can store data objects, etc. The users (or "customers") of provider networks 100 may utilize one or more user accounts that are associated with a customer account, though these terms may be used somewhat interchangeably depending upon the context of use. Users may interact with a provider network 100 (e.g., using a client device 104 such as a personal computer (PC), laptop, mobile device, smart device, etc.) across one or more intermediate networks 106 (e.g., the internal via one or more interface(s) 105, such as through use of application programming interface (API) calls, via a console implemented as a website or application, etc. The interface(s) 105 may be part of, or serve as a front-end to, a control plane 103 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

A user 102 may seek to run an annotation job via the annotation service 110, e.g., to generate labeled data elements that may be used, for example, by the user 102 to later train a machine learning model. For example, the user 102 may have a set of input data elements 138 such as a collection of images (e.g., a library of hundreds, thousands, or more digital images of various organisms that a user may wish to use to construct an insect recognition ML model). Thus, the user 102 may optionally upload (at circle (1)) or submit these input data elements 138 to a storage location that may be provided by a storage service 136 of a provider network 100, or the input data elements 138 may be available at another storage location outside the provider network 100.

The user 102 may then utilize a client device 104 to interact with the annotation service 110 (e.g., via web service calls made via HyperText Transfer Protocol (HTTP) messages, for example) to create and implement an annotation job for a set of annotators—e.g., humans that can provide annotations of some sort, such as labels, descriptions, bounding boxes, etc., or machine learning models that can annotate images, or a combination of both human annotators and "automated" annotators such as via the use of active learning techniques.

Generally, active learning is a machine learning-based technique that can be useful in reducing the amount of human-annotated data required to achieve a target performance Active learning often starts by incrementally training a ML model with a small, labeled dataset and then applying this model to the unlabeled data. For each unlabeled sample, the system estimates whether this sample includes information that has not been learned by the model. An example of active learning algorithm is to train an object detection model that takes an image as input and outputs a set of bounding boxes. To train such an object detection model, the training and validation images of the detector are annotated with a bounding box per object and its category. Such algorithms start with a small training set of annotated images to train a baseline object detector. In order to improve the detector by training with more images, the algorithm continues to collect images to annotate. Rather than annotating all newly collected images, based on different characteristics of the current detector, the active learning service can select a subset of the images to be manually labeled by human annotators. Once annotated, these selected images are added to the training set to incrementally train the object detection model. The entire process continues to collect more images, select a subset with respect to the object detector, annotate the selected ones with humans, incrementally train the detector and so on. Other data, such as video data, audio data, etc. may also be used in such a system.

Turning to FIG. 2, the user 102 may utilize an application (e.g., a web-based application in a browser, a mobile application, a library, an operating system specific application, etc.) to interact with the annotation service 110 to configure and launch an annotation job. FIG. 2 is a diagram illustrating one exemplary user interface 200 for configuring an annotation job according to some embodiments. In this user interface 200, a user may provide a name for an annotation job ("name"), an identifier of the input dataset (the input data elements 138) such as a storage location (e.g., a URL or URI) storing the input data elements 138 ("input dataset location"), and/or an identifier of a location where data generated by the annotation job should be stored ("output dataset location").

The user may also define a particular type of task for the annotation job, which can identify what type of annotation the annotators are to provide. In this example, the user interface 200 allows the user to select between "image classification" and "object detection," though in other embodiments the annotation service 110 can allow for more, fewer, and/or different types of annotation tasks known to those of skill in the art. Continuing the example, the user in this figure may seek to implement an image classification job, and provide a job description of "label whether there is an insect in the image", where each annotator can select "YES" or "NO" as specified by the job submitting user.

The user may also provide instructions to the annotators to explain how to perform their task. As described herein, it is very important for users to provide high-quality instructions to annotators to ensure high-quality results. As a part of this task it may be important for users to identify and describe how to handle "difficult" edge cases that may be difficult even for experienced annotators to perform.

In FIG. 2, the user may fill in a box with a textual description of the task, and may also provide (or identify) one or more of: a set of "good" examples where annotators can easily provide the correct annotations (to allow the annotators to gain a quick fundamental understanding of the task), a set of "bad" examples where annotators are unable to provide the correct annotations, and/or a set of "edge case" examples where annotators may provide somewhat low-quality annotations and/or disagree as to what the proper annotation should be, where additional instruction on behalf of the submitting user may be able to eliminate such confusion, and thus, increase the quality of the annotation results. In this example, the user may select an option to have the annotation service 110 automatically identify images of one or more of these sets—e.g., good examples, bad examples, and/or edge case images (and automatically add them to a set of job instructions provided to the annotators or recommend them to the job-submitting user for inclusion, etc.), though the user may also manually specify images for these sets, and/or the user may both initially specify images and also have the annotation service 110 further identify images.

Turning back to FIG. 1, upon providing sufficient information to define an annotation job, the user 102 may submit the job, causing the client device 104 to issue a request message at circle (2) destined to the annotation service 110. The request message may be carried by one or more Hyper-Text Transfer Protocol (HTTP) messages and may be sent to a web service endpoint of the provider network 100 and provided to the annotation service 110.

The AJC 112 may receive the request and begin to configure the annotation job. For example, the AJC 112 may at circle (3) store job information 128 (e.g., the information provided via the interface 200 of FIG. 2, along with other metadata such as timestamps, a user identifier, etc.) in an annotation job repository 114 (e.g., a database implemented "within" the service, or possibly a database provided by another service of the provider network (not illustrated)). The AJC 112 may also select a set of annotators 106A-106N (e.g., via annotator information 126 stored in the annotation job repository 114) for the job or make the job available to annotators 106A-106N (e.g., via a dashboard of available jobs), where ones of the annotators can choose to perform annotation tasks as part of the job.

The annotation job may implement an active learning technique in which a base ML model is trained and some of the input data elements 138 may be sent to annotators 106, where the results from the annotators may be utilized to further train this ML model. Optimally, this process allows the base active learning ML model to be used to generate annotations for a large amount of the input data elements 138 (which may include hundreds, thousands, tens of thousands, or more data elements) and use human annotators for a comparatively small amount of the input data elements 138.

For example, the annotation service 110 may send a portion of the input data elements 138 to annotators 106A-106N for annotation at circle (4). For example, the annotation service 110 may send information (e.g., files or data for a web page) including the instructions 130 and an identifier of one or more of the input data elements 138 (e.g., URL(s)) or the input data elements 138 themselves to a client device 108A of an annotator 106A, which is presented to the annotator 106A, who may utilize a user interface to view (or otherwise sense, such as through hearing an audio clip) the instructions, view/sense a data element, and provide an annotation (e.g., an identifier of a class, draw a bounding box, etc.) according to the instructions.

The annotator 106A may then submit the annotation (e.g., by selecting a user input element such as a "submit" button), causing a message to be transmitted by the client device 108A back to the AJC 112, which may update its job results 134 data (with the annotation, an identifier of the data element, an identifier of the annotator, etc.).

In some embodiments, a same data element may be provided to multiple annotators for annotation, and the multiple annotations may be "consolidated" into one "final" annotation (or "label", though these terms may be used somewhat interchangeably unless otherwise indicated) at circle (5) by one or more annotation consolidation modules 124. This process follows the concept of the wisdom of the crowd, where a mistake of one annotator may be overruled by other annotators providing the proper annotation. Accordingly, the AJC 112 may provide a same input element to multiple annotators, and upon receipt of multiple annotations from these annotators, the AJC 112 may use an annotation consolidation module 124 to "combine" the multiple annotations into a single annotation, which may also produce a confidence score indicating how much confidence exists in the overall annotation.

In some embodiments, the AJC 112 includes multiple annotation consolidation modules 124—e.g., one for each type of annotation task. For example, a first type of annotation consolidation module 124 may be used for classification tasks, and may include selecting a most popular/common annotation as the "final" correct annotation (e.g., a simple majority vote), performing a weighted selection according to the confidence the system has in particular annotators (e.g., as determined by an annotator quality score module 116 to be described herein, and optionally stored in annotator information 126 records in the repository 114) where the annotations of more reliable annotators are given higher weight in determining a final annotation, using an intersection over union metric, etc. As another example, a second type of annotation consolidation module 124 may be used for bounding box consolidation, which could include computing average reference points (e.g., the average "starting x", ending x, starting y, and ending y coordinates) to generate a composite bounding box, computing weighted average reference points based on annotator quality scores, etc. Confidence scores for these values may similarly be generated based on the collection of annotations (e.g., how similar or different they are), what annotators provided the annotations (e.g., via the annotator quality scores), etc., to indicate an amount of confidence the annotation consolidation module 124 has that the overall consolidated annotation is correct. The consolidated annotations (and optionally, confidences) may also be stored as part of job results 134 in the repository 114 (e.g., with an identifier of the corresponding data element, a time of annotation, etc.), and in some embodiments the individual annotations provided by the individual annotators may also be recorded.

In some embodiments, when a "final" consolidated annotation is generated, at circle (6) an annotator quality score module 116 may update a quality score for the involved annotators. A quality score indicates a level of correctness of the annotations provided by an annotator over time. For example, if an annotator has provided ten annotations, and after consolidation (and/or explicit confirmation by another system or user) it is determined that the annotator provided the exact correct result each of the ten times, the annotator may have a perfect quality score (e.g., 1.0/1.0, 100/100, etc.); likewise, if the annotator provided the correct result seven times out of ten, the annotator may have a lower quality score (e.g., 0.7/1.0 or 70/100). In the case of bounding boxes, the quality score may be based on a difference value (e.g., how close/similar the annotator's bounding box was to that of the consolidated bounding box, etc.) for each annotation. Thus, at circle (6), the annotators 106A-106N contributing annotations to a consolidated annotation may have their quality scores updated by the annotator quality score module 116, which may be stored to the annotator information 126 in the repository 114.

Periodically (or according to some defined schedule or upon a particular event), an auto-example selection module 118 at circle (7) may run to automatically detect data elements that may be included as candidates for inclusion in one or more of the sets of types of examples—good example, bad examples, edge case examples, etc.

For example, in some embodiments the auto-example selection module 118 may use a model including logic to analyze the results from the consolidation of annotations (e.g., from annotation consolidation module(s) 124) and the annotator quality scores (updated by annotator quality score module 116) to identify good examples, bad examples, and/or edge case examples.

In this manner, in some embodiments, the auto-example selection module 118 analyzes an annotated data element and if it detects that a threshold amount (e.g., 90%, 98%, 100%) of the annotators provided back an annotation that was the same (or within a threshold amount of error from each other or a consolidated label), the auto-example selection module 118 may mark that data element as a candidate to be a "good" example because a significant number of the annotators labeled it correctly or near-correctly.

As another example, the auto-example selection module 118 may analyze an annotated data element and if it detects that a threshold amount (e.g., 90%, 100%) of the annotators provided back an incorrect annotation or completely different annotations, the auto-example selection module 118 may mark that data element as a candidate to be a "bad" example because a significant number of the annotators labeled it incorrectly. The auto-example selection module 118 may also utilize the quality scores of the involved annotators as part of the determination, and only mark a data element when the quality scores of all (or a threshold amount of) the annotators are above a threshold (indicating that high-quality annotators all struggled with the task), or when quality scores from the annotators exist in multiple ranges of scores (indicating that multiple annotators of differing qualities all struggled with the task), etc.

As another example, the auto-example selection module 118 may analyze an annotated data element and if it detects that some threshold amount (e.g., two, three, etc.) annotators having "high" quality scores (above some threshold) provided back substantially or completely different annotations, the auto-example selection module 118 may mark that data element as a candidate to be an "edge case" example because a significant number of high-quality annotators labeled it incorrectly.

Alternatively—or additionally, as described later herein—in some embodiments the auto-example selection module 118 may utilize an active learning ML model (described above) trained using annotations from annotators 106 to select data elements for inclusion in the candidate set(s) of examples. This active learning model may comprise a ML model (such as a convolutional neural network (CNN) or other deep model) that is trained with actual input data elements (e.g., images) using the consolidated annotations/labels, and optionally other metadata such as a confidence score of the consolidated annotations, individual annotations of the involved annotators, and/or quality scores of the involved annotators. The ML model may thus be created, through this iterative training, to perform inference by examining a data element to predict/infer a label along with a corresponding confidence score for its label for the data element.

When a low (or extremely low) confidence score results (e.g., that lies beneath a first threshold, or above a first threshold and below a second threshold), the data element may be marked as an edge case and/or "bad" data elements candidate example. Similarly, when a very high confidence score results from an inference on the part of this active learning model, the data element may be a good candidate for inclusion as a "good" data element example in the job instructions to convey, clearly and simply, an easy annotation that all annotators should be able to quickly understand. A relatively large number—or even all—of the set of input data elements may be analyzed with this model to generate candidate sets of data elements—e.g., a candidate set of edge case data elements, a candidate set of good data elements, etc.

As indicated above, some embodiments use both the annotation consolidation and quality score logic (also referred to as "consolidation/score logic") combined with the active learning model to identify data element examples. For example, in some embodiments while the active learning model is still being trained, the auto-example selection module 118 may rely only upon the consolidation/score logic to make candidate determinations, and after the active learning model has reached a point where it is not being trained or is of sufficient maturity/quality, the auto-example selection module 118 may switch to instead use the active learning model. However, in some embodiments, the auto-example selection module 118 may use both techniques together, where each module can "vote" on whether a data element should be included in a candidate set.

Figure 3:
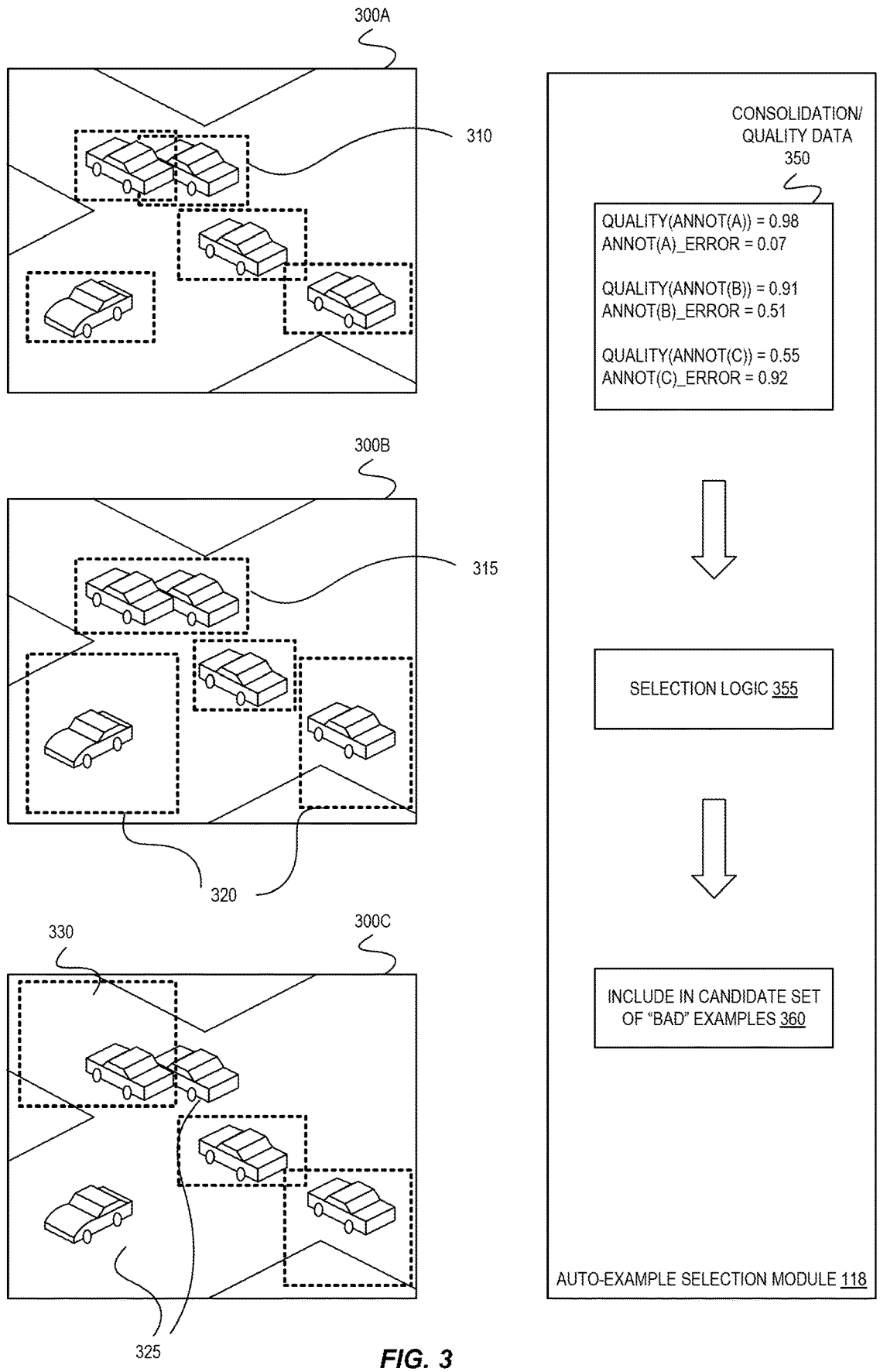
FIG. 3 is a diagram illustrating exemplary image data elements, annotations, annotator quality scores, and consolidation error values according to some embodiments.

For further detail, FIG. 3 is a diagram illustrating exemplary image data elements, annotations, annotator quality scores, and consolidation error values according to some embodiments. In this example, an annotation job was submitted to have the annotation service perform object detection to identify automobiles within images, causing annotators to be tasked with drawing bounding boxes around automobiles. In this example, a same image 300 has been presented to (at least) three different annotators, who have returned the following annotations here illustrated overlaid as images 300A-300C.

For the first image 300A an annotator (annotator "A") drew a high-quality set of bounding boxes around all depicted automobiles, where the bounding boxes are relatively "tight" to the automobiles (i.e., do not include large amounts of the image that are not automobiles), each automobile included in a bounding box, and even a partially-obscured automobile had a high-quality bounding box 310 drawn. As shown in the top of the consolidation/quality data 350 (used by the auto-example selection module 118), this annotation is associated with a "quality" annotator score (based in part on this annotation, as well as other previous annotations) for the annotator of 0.98 (e.g., of a possible 1.00, indicating an extremely high quality of annotations being provided by the annotator) along with a relatively low annotation error score of 0.07 (e.g., where 0.00 is no error, and 1.00 is a maximum error, when compared with the ultimately-found annotation).

As another example, for the second image 300B an annotator (annotator "B") technically drew bounding boxes around all depicted automobiles, but included two automobiles within a single bounding box 315, which was not the intent of the job-submitting user. Further, some of the bounding boxes 320 are relatively "loose" to the automobiles (i.e., do include some substantial amounts of the image that are not automobiles). As shown in the top of the consolidation/quality data 350 (used by the auto-example selection module 118), this annotation is associated with a "quality" annotator score for the annotator of 0.91 (e.g., of a possible 1.00, indicating a high quality of annotations typically being provided by the annotator) along with an annotation error score of 0.51, indicating a fair amount of error in the annotation.

As another example, for the third image 300C an annotator (annotator "C") did not draw bounding boxes around all depicted automobiles 325, and some of the bounding boxes 330 are relatively "loose" to the automobiles. As shown in the top of the consolidation/quality data 350, this annotation is associated with a "quality" annotator score for the annotator of 0.55 (e.g., indicating a medium-to-low quality of annotations typically being provided by the annotator) along with an annotation error score of 0.92, indicating a large amount of error in the annotation.

As a result, this consolidation/quality data 350 may be used by selection logic 355 of the auto-example selection module 118 to determine whether the image 300 should be included in any candidate sets to be included in job instructions. This may occur, as indicated above, when an active learning model is not yet fully trained, or in addition to use of the active learning model, to detect data elements to be included in one or more candidate sets. In this example, the selection logic 355 may indicate that the image is to be included in a candidate set of bad examples at block 360, perhaps due to the relatively large amounts of annotation error on the part of the annotators, the quality scores of these annotators, the differing numbers of bounding boxes in the annotations, etc. The various types of logic 355 implemented can be adapted and customized by those of skill in the art to suit the particular needs of the system and/or the preferences of the implementor.

Figure 4:
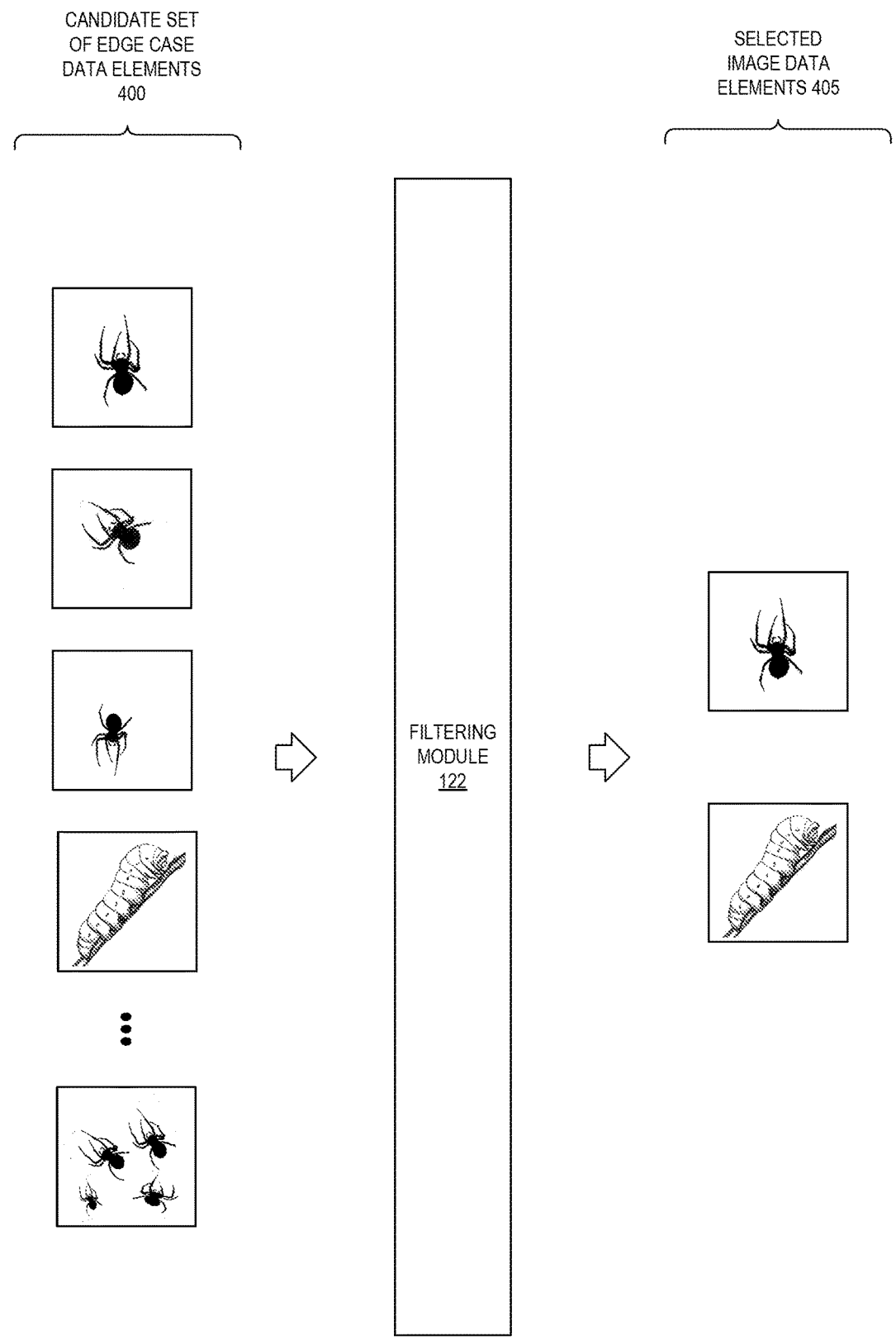
FIG. 4 is a diagram illustrating an exemplary use of a filtering module to select a representative set of image data elements from a larger candidate set of elements to be used in annotation job instructions according to some embodiments.

Turning back to FIG. 1, in embodiments where one or more candidate sets of data elements have been generated, the example selection module 118 may optionally use a filtering module 122 to shrink the number of data elements from the candidate set(s). For example, FIG. 4 is a diagram illustrating an exemplary use of a filtering module to select a representative set 405 of image data elements from a larger candidate set of elements 400 to be used in annotation job instructions according to some embodiments. As shown, it may be the case that a candidate set of data elements may be quite large, and moreover, many of the data elements may be related. In this case, many of the shown image data elements include spiders, whereas one image is shown that is different (e.g., with a caterpillar). Thus, embodiments can automatically reduce the candidate set to a much smaller set to identify different types of data elements that are likely more representative of different types of edge cases, good images, etc.—e.g., one spider and one caterpillar.

The filtering module 122 may be implemented using a variety of techniques. As one example, the filtering module 122 may generate a representation of each data element (e.g., an embedding) via an embedding generator that is specific to the type of the data element (e.g., image, audio clip, etc.). Various types of embedding generators are known of those of skill in the art. With these embeddings, the filtering module 122 may utilize a representative data element selector to identify a number of different embeddings corresponding to different data elements. In some embodiments, the element selector comprises a clustering ML model (e.g., implementing a k-means type algorithm) to identify different clusters of data elements and the element selector selects one or more data elements from each cluster (or from some subset of the clusters), such as centroids from the clusters. Alternatively, the element selector may comprise a distance comparison engine that generates distances (or similarities) between pairs of the embeddings (using distance metrics/techniques known to those of skill in the art) and selecting one or more of the data elements from the candidate set based on these distances (or similarities). For example, a first data element may be selected that has a highest overall combined distance to all other data elements, and potentially a second data element may be selected that has a second highest overall combined distance to all other data elements, etc.

Alternatively, in some embodiments using an active learning model where the inclusion of data elements in a candidate set may be based on the confidence of a label/annotation generated by the active learning model, the auto-example selection module 118 may simply identify a set number of data elements satisfying a criteria—e.g., select the top or bottom five data elements with the highest overall confidence scores, etc. —and thus a filtering module 122 may not be needed.

With a selected set of images (e.g., for edge cases, for "good" cases), the AJC 112 may update the job instructions 130 at circle (8) based on the new, helpful selected examples 132 to assist annotators doing further work on the annotation job at circle (9), resulting in higher-quality results being generated, which ultimately may be stored in job results 134 and/or as output data 140. At circle (8) the AJC 112 may also update a set of job results 134, e.g., to mark/label selected ones of the data elements with tags indicating whether they are included in a particular set. In some embodiments, the AJC 112 may at circle (A) optionally send identifiers of the selected examples 132 to the client device 104 in a first message, and solicit a confirmation from the user 102 (e.g., in another message) as to whether some or all of the data elements should be included in the job instructions 130. The user 102 may also provide a textual description associated with these data elements that explains to the annotators how they should be annotated and possibly the reasoning why they should be annotated that way.

For example, FIG. 5 is a diagram illustrating an exemplary user interface including an adaptive instruction for an annotation job presenting selected image data elements according to some embodiments. As shown at 500, the job instruction is shown with a simple text description—draw a box around any automobile shown in the image—along with drop down menus allowing the annotator to view provided "good" or "poor" or "edge case" examples, assuming they were provided.

As described above, a set of data elements may be discovered over time by the AJC 112 which can eventually be incorporated into the job instructions resulting in the instructions being adapted over time. This is shown at 550, in which the job instructions have been adapted to include good examples, poor examples, and edge case examples, a good example user interface element 555 is expanded to show one of the "good example" images that clearly show a straightforward image and how the annotations should be drawn. A user may browse through multiple such examples of these example sets using user interface elements known to those of skill in the art.

Thus, in FIG. 1, the updated or adapted job instructions can be provided at circle (9) to annotators working on the annotation job, and the process may continue as described (potentially updating the job instructions multiple times), with the annotator quality scores continuing to be updated, and potentially the active learning model(s) continuing to be trained. At some point, the annotation job may complete, and the results stored to an output data 140 location indicated by the user 102 or otherwise provided back to the user 102. In some embodiments, the user 102 may use the annotated data as training data to train another ML model (e.g., via a machine learning service (not illustrated) of the provider network 100), which may then be used thereafter to perform inferences.

Additionally, if an annotation job is halted or partially executed, upon a user seeking to restart the job, embodiments can proactively suggest ones of the data elements that may be useful for inclusion in the job instructions, saving the user a significant amount of time that would be needed to search for helpful examples.

Figure 6:
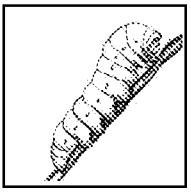
FIG. 6 is a diagram illustrating an exemplary user interface including user input elements soliciting annotation feedback for an annotation job according to some embodiments.

Another optional feature is presented in FIG. 6, which is a diagram illustrating an exemplary user interface including user input elements soliciting annotation feedback for an annotation job according to some embodiments. In some embodiments, when a data element is determined as likely being an "edge case" or a "poor example"—and thus, where the annotation may be difficult—the AJC 112 may dynamically update the user interface of the annotator to emphasize the instructions, alert the annotator to be careful, and/or solicit additional feedback that can be used for annotation consolidation, etc. For example, in the example user interface 600, the annotation user interface may be modified to include a first user input element 605 requiring the user to select a checkbox indicating that they have carefully read the instructions and viewed all provided examples. As another example, the annotation user interface may be modified to include a user input element 610 allowing the annotator to express how confidant they are in their annotation—here, a "slider bar" is provided allowing for the user to slide a slider to indicate a somewhat granular indication of something between "not confident" and "extremely confident," which can be translated into a value (e.g., a numeric score between 0-100) and provided back to the AJC 112 for use in consolidation, training, etc.

Figure 7:
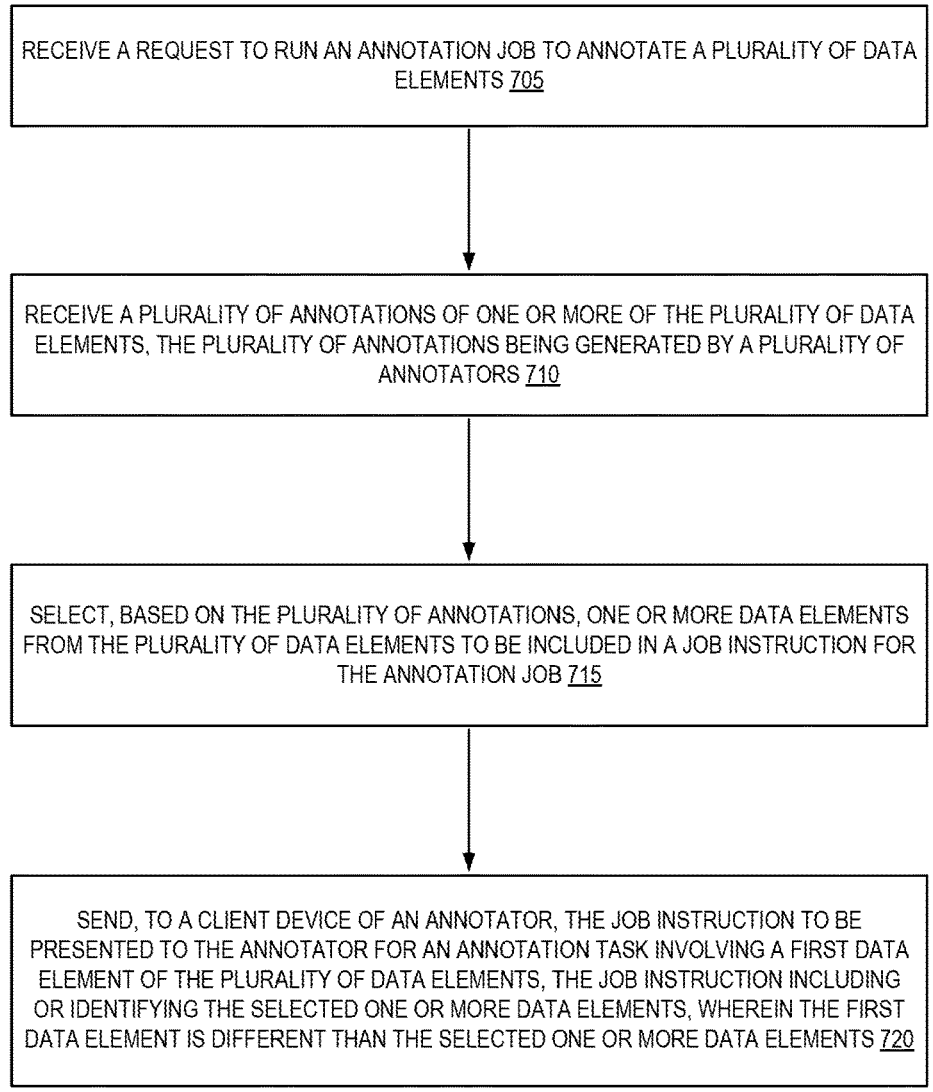
FIG. 7 is a flow diagram illustrating operations of a method for ML-based adaptive instruction creation for annotation according to some embodiments.

FIG. 7 is a flow diagram illustrating operations 700 of a method for ML-based adaptive instruction creation for annotation according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by the annotation service 110 (e.g., the AJC 112) of FIG. 1.

The operations 700 include, at block 705, receiving a request to run an annotation job to annotate a plurality of data elements. The request may be received at a web service endpoint of a provider network and may be carried by an HTTP request message. The request may be originated by a client device located outside of the provider network. The request may include an identifier of a storage location of data elements to be annotated.

At block 710, the operations 700 include receiving a plurality of annotations of one or more of the plurality of data elements, the plurality of annotations being generated by a plurality of annotators. Each of the plurality of annotations may be a class identifier (e.g., a number corresponding to class, a class name), a bounding box, etc. Block 710 may include receiving multiple annotations for each of one or multiple data elements, which may or may not be fewer than all of the plurality of data elements.

The operations 700 include, at block 715, selecting, based on the plurality of annotations, one or more data elements from the plurality of data elements to be included in a job instruction for the annotation job. The selecting may be based on a use of a model including logic that is based on the plurality of annotations and further based on a plurality of annotator quality scores of the plurality of annotators, where each annotator quality score is based on a set of annotations provided by the corresponding annotator for one or more previous annotation jobs. In some embodiments, the operations 700 further include generating the one or more annotator quality scores, wherein a first annotator quality score for a first annotator is based on a determination, for each of the set of annotations of the first annotator, of an amount of similarity between the annotation and a consolidated annotation for the corresponding annotation task.

In some embodiments, the operations 700 further include iteratively training a machine learning (ML) model based on labels derived from the plurality of annotations, wherein the selecting of the one or more data elements in block 715 is based on use of the ML model. For example, in some embodiments block 715 includes running the ML model with ones of the plurality of data elements as inputs to generate a plurality of inferences and a corresponding plurality of confidence scores indicating confidences of the corresponding inferences, where the selecting of the one or more data elements is based on the plurality of confidence scores. In some embodiments, block 715 includes selecting, as the one or more data elements, those of the plurality of data elements having the largest or smallest corresponding confidence scores, or alternatively selecting, as the one or more data elements, those of the plurality of data elements having a corresponding confidence score between a first threshold and a second threshold.

In some embodiments, block 715 includes identifying a candidate set of data elements (e.g., "good" examples, "bad" examples, "edge case" examples, etc.) from the plurality of data elements, and selecting the one or more data elements from the candidate set of data elements based on an analysis of characteristics of the candidate set of data elements.

At block 720, the operations 700 include sending, to a client device of an annotator, the job instruction to be presented to the annotator for an annotation task involving a first data element of the plurality of data elements, the job instruction including or identifying the selected one or more data elements, wherein the first data element is different than the selected one or more data elements. The job instruction may also include a textual description provided by the user indicating how to annotate each of the selected one or more data elements.

In some embodiments, the selected one or more data elements are presented to the annotator as examples of difficult to annotate data elements.

According to some embodiments, the operations 700 further include selecting a second set of one or more data elements from the plurality of data elements, where the job instruction further includes or identifies the second set of data elements.

The operations 700 may optionally include selecting one of the plurality of data elements to be annotated by at least a first annotator, determining that the one data element is likely to be difficult to annotate, and sending a first one or more messages to a first client device of the first annotator. The first one or more messages carry the job instruction and further include code or data causing the first client device to solicit an additional user input from the first annotator indicating that the first annotator has viewed the job instruction or indicating a level of confidence on the part of the first annotator in an annotation being provided by the annotator. The operations 700 may further include receiving a second one or more messages originated by the first client device carrying the annotation and an identifier of the additional user input.

Figure 8:
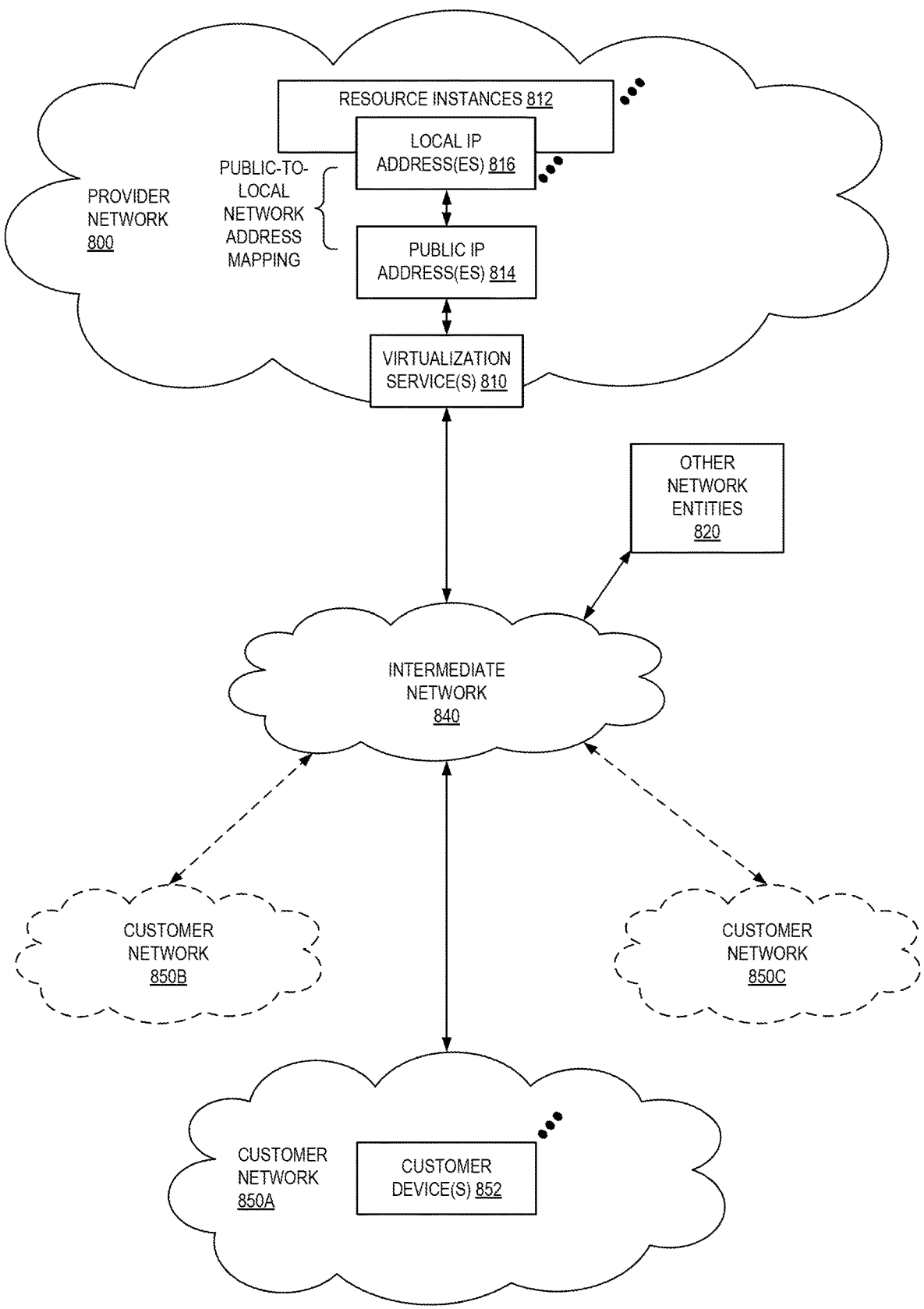
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
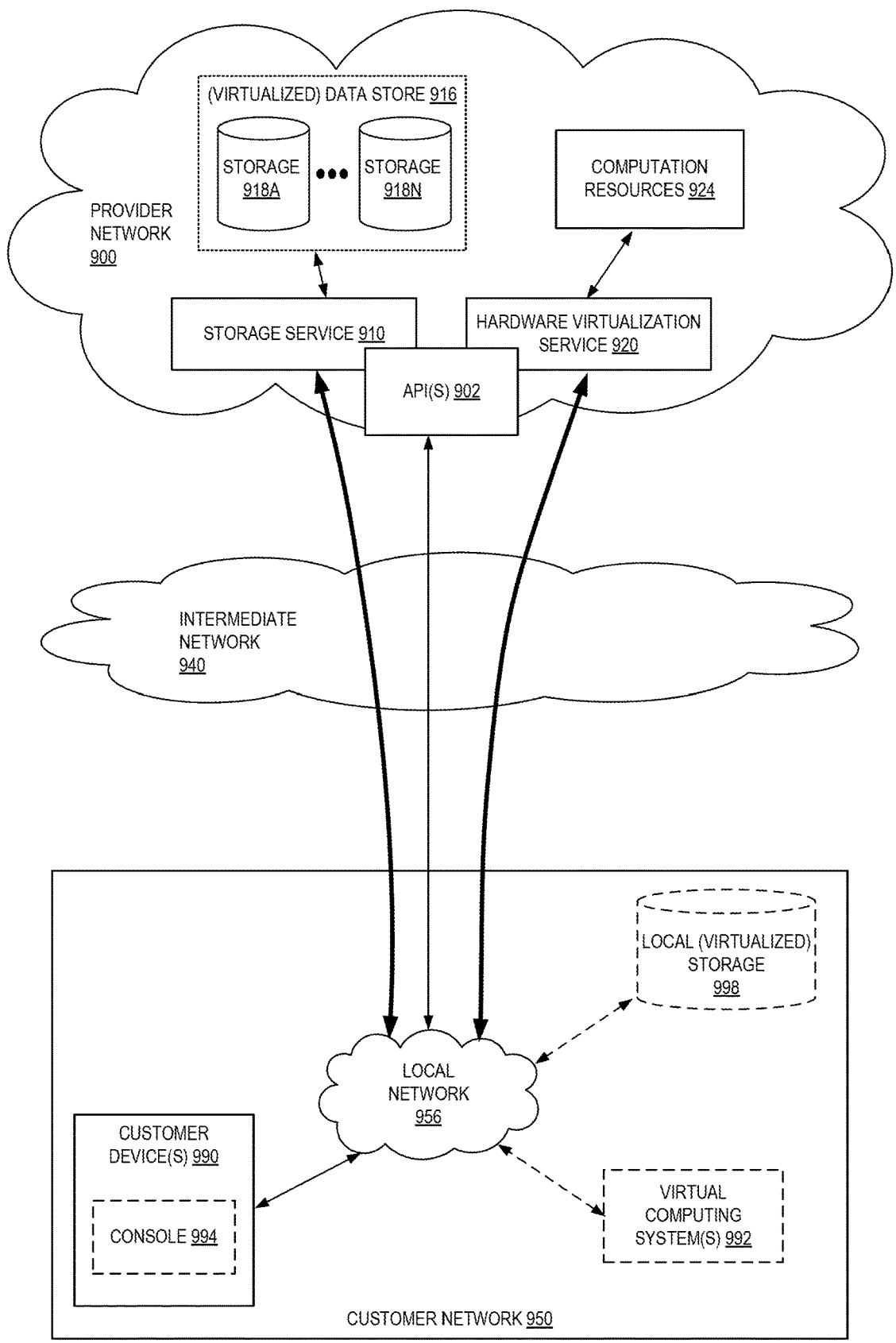
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
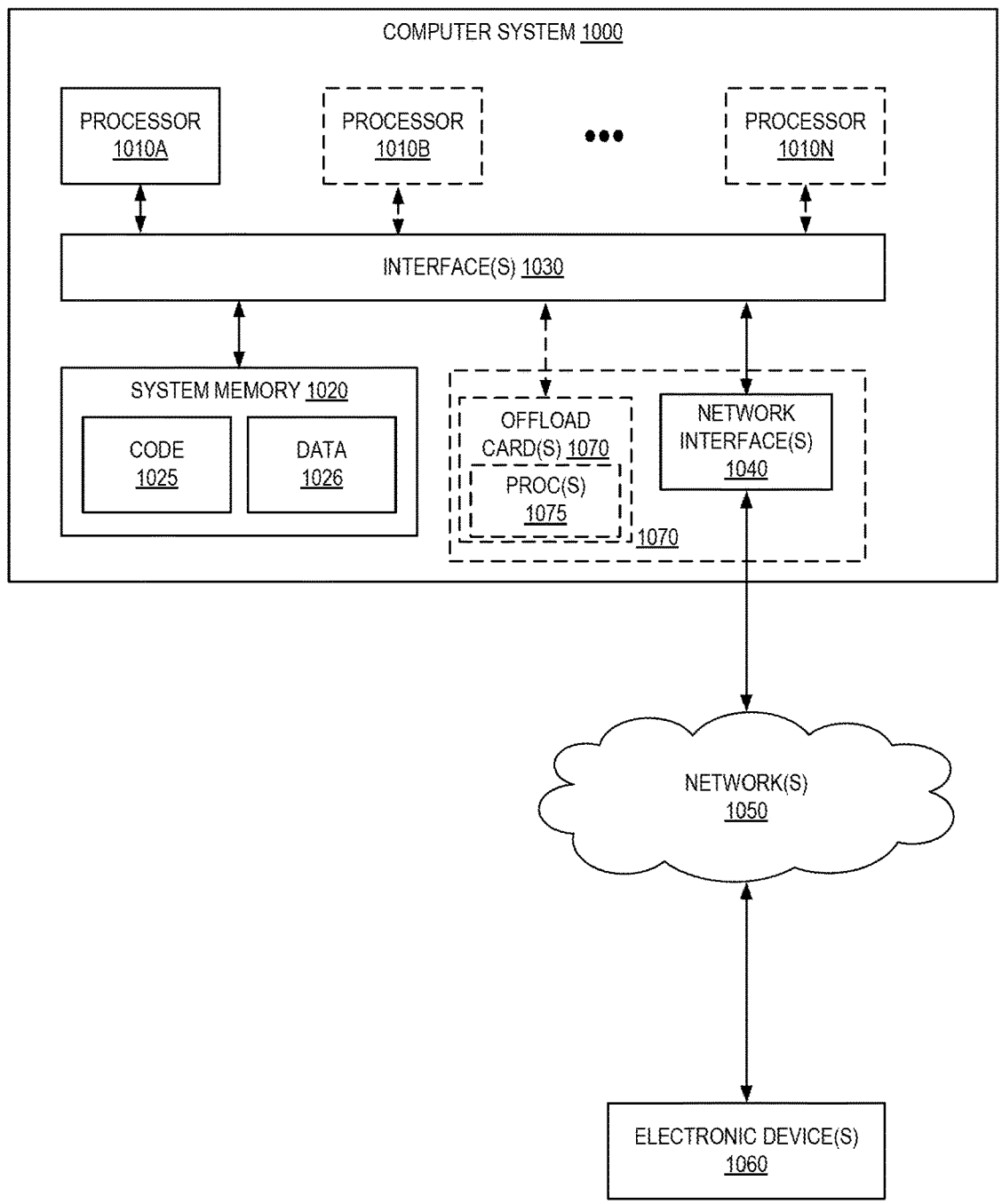
FIG. 10 is a block diagram illustrating an example computer system that may be used in some embodiments.

In some embodiments, a system that implements a portion or all of the techniques for generating and utilizing machine learning based adaptive instructions for annotation as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
  receiving, at a web service endpoint of a provider network, a request originated by a user to run an annotation job to annotate a plurality of images, the request identifying a storage location of the plurality of images;
  sending a plurality of messages to a plurality of annotators as part of the annotation job, each of the plurality of messages including an annotation job instruction and identifying at least one of the plurality of images;
  receiving a plurality of annotations of one or more of the plurality of images, the plurality of annotations being generated by the plurality of annotators;
  updating annotator quality scores of the plurality of annotators, the annotator quality scores being based in part on annotations of the plurality of annotators generated for previous annotation jobs;
  iteratively training a machine learning (ML) model based on the plurality of annotations and the one or more of the plurality of images;
  running the ML model to select one or more images from the plurality of images; and
  sending, to a client device of an annotator, an updated version of the annotation job instruction to be presented to the annotator for an annotation task of the annotation job involving a first image of the plurality of images, the updated version of the annotation job instruction being adapted versus the annotation job instruction to at least include or identify the selected one or more images as examples relevant to the annotation task, wherein the first image is different than the selected one or more images.

2. The computer-implemented method of claim 1, wherein running the ML model to select one or more images from the plurality of images includes:
  generating, for each of the plurality of images using the ML model, an inference and a corresponding confidence score,
  wherein the selection of the one or more images is based on the confidence scores.

3. The computer-implemented method of claim 2, wherein running the ML model to select one or more images from the plurality of images further includes:
  selecting, as the one or more images, a number of the plurality of images having the highest or lowest of the corresponding confidence scores.

4. A computer-implemented method comprising:
  receiving a request to run an annotation job to annotate a plurality of data elements;
  receiving a plurality of annotations of one or more of the plurality of data elements, the plurality of annotations being generated by a plurality of annotators based at least in part on the plurality of annotators receiving an annotation job instruction;
  selecting, based on the plurality of annotations, one or more data elements from the plurality of data elements to be included in an updated version of the annotation job instruction for the annotation job; and
  sending, to a client device of an annotator, the updated version of the annotation job instruction to be presented to the annotator for an annotation task involving a first data element of the plurality of data elements, the updated version of the annotation job instruction being adapted versus the annotation job instruction to at least include or identify the selected one or more data elements as examples relevant to the annotation task, wherein the first data element is different than the selected one or more data elements.

5. The computer-implemented method of claim 4, wherein the selecting of the one or more data elements comprises using a model including logic that is based on the plurality of annotations and further based on a plurality of annotator quality scores of the plurality of annotators, wherein each annotator quality score is based on a set of annotations provided by the corresponding annotator for one or more previous annotation jobs.

6. The computer-implemented method of claim 5, further comprising generating the one or more annotator quality scores, wherein a first annotator quality score for a first annotator is based on a determination, for each of the set of annotations of the first annotator, of an amount of similarity between the annotation and a consolidated annotation for the corresponding annotation task.

7. The computer-implemented method of claim 4, further comprising:
  iteratively training a machine learning (ML) model based on labels derived from the plurality of annotations,
  wherein the selecting of the one or more data elements is based on use of the ML model.

8. The computer-implemented method of claim 7, wherein the selecting of the one or more data elements comprises:
  running the ML model with ones of the plurality of data elements as inputs to generate a plurality of inferences and a corresponding plurality of confidence scores indicating confidences of the corresponding inferences,
  wherein the selecting of the one or more data elements is based on the plurality of confidence scores.

9. The computer-implemented method of claim 8, wherein the selecting of the one or more data elements further comprises:
  selecting, as the one or more data elements, those of the plurality of data elements having the largest or smallest corresponding confidence scores.

10. The computer-implemented method of claim 8, wherein the selecting of the one or more data elements further comprises:
  selecting, as the one or more data elements, those of the plurality of data elements having a corresponding confidence score between a first threshold and a second threshold.

11. The computer-implemented method of claim 4, wherein the selecting comprises:
  identifying a candidate set of data elements from the plurality of data elements; and
  selecting the one or more data elements from the candidate set of data elements based on an analysis of characteristics of the candidate set of data elements.

12. The computer-implemented method of claim 4, wherein the selected one or more data elements are presented to the annotator as examples of difficult to annotate data elements.

13. The computer-implemented method of claim 4, further comprising:
  selecting a second set of one or more data elements from the plurality of data elements, wherein the updated version of the annotation job instruction is further adapted versus the annotation job instruction to include or identify at least the second set of data elements.

14. The computer-implemented method of claim 4, further comprising:

selecting one of the plurality of data elements to be annotated by at least a first annotator;

determining that the one data element is likely to be difficult to annotate; and sending a first one or more messages to a first client device of the first annotator, the first one or more messages carrying the updated version of the annotation job instruction and further including code or data causing the first client device to solicit an additional user input from the first annotator indicating that the first annotator has viewed the updated version of the annotation job instruction or indicating a level of confidence on the part of the first annotator in an annotation being provided by the annotator; and receiving a second one or more messages originated by the first client device carrying the annotation and an identifier of the additional user input.

15. A system comprising:

a storage service implemented by a first one or more electronic devices of a provider network to store a plurality of data elements at a storage location; and an annotation service implemented by a second one or more electronic devices, the annotation service including instructions that upon execution cause the annotation service to:

receive a request to annotate the plurality of data elements, the request identifying the storage location;

receive a plurality of annotations of one or more of the plurality of data elements, the plurality of annotations being generated by a plurality of annotators based at least in part on the plurality of annotators receiving an annotation job instruction;

select, based on the plurality of annotations, one or more data elements from the plurality of data elements to be included in an updated version of the annotation job instruction for the annotation job; and send, to a client device of an annotator, the updated version of the annotation job instruction to be presented to the annotator for an annotation task involving a first data element of the plurality of data elements, the updated version of the annotation job instruction being adapted versus the annotation job instruction to at least include or identify the selected one or more data elements as examples relevant to the annotation task, wherein the first data element is different than the selected one or more data elements.

16. The system of claim 15, wherein the instructions upon execution further cause the annotation service to:

generate one or more annotator quality scores based on a set of annotations provided by a corresponding annotator for one or more previous annotation jobs, wherein a first annotator quality score for a first annotator is based at least in part on a determination, for each of the set of annotations of the first annotator, of an amount of similarity between the annotation and a consolidated annotation for the corresponding annotation task.

17. The system of claim 15, wherein the selection of the one or more data elements comprises a use of a model including logic that is based on the plurality of annotations and further based on a plurality of annotator quality scores of the plurality of annotators, wherein each annotator quality score is based on a set of annotations provided by the corresponding annotator for one or more previous annotation jobs.

18. The system of claim 15, wherein the instructions upon execution further cause the annotation service to:

iteratively train a machine learning (ML) model based on labels derived from the plurality of annotations, wherein the annotation service is to select the one or more data elements based on use of the ML model.

19. The system of claim 15, wherein to select the one or more data elements, the instructions upon execution cause the annotation service to:

run the ML model with ones of the plurality of data elements as inputs to generate a plurality of inferences and a corresponding plurality of confidence scores indicating confidences of the corresponding inferences, wherein the selection of the one or more data elements is based on the plurality of confidence scores.

20. The system of claim 15, wherein to select the one or more data elements, the instructions upon execution further cause the annotation service to:

select, as the one or more data elements, those of the plurality of data elements having the largest or smallest corresponding confidence scores.

\* \* \* \* \*